US010445320B2

(12) United States Patent
Kobayashi

(10) Patent No.: US 10,445,320 B2
(45) Date of Patent: Oct. 15, 2019

(54) DOCUMENT SEARCH APPARATUS, NON-TRANSITORY COMPUTER READABLE MEDIUM, AND DOCUMENT SEARCH METHOD

(71) Applicant: FUJI XEROX CO., LTD., Tokyo (JP)

(72) Inventor: Saneyuki Kobayashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 141 days.

(21) Appl. No.: 15/429,451

(22) Filed: Feb. 10, 2017

(65) Prior Publication Data

US 2018/0032577 A1 Feb. 1, 2018

(30) Foreign Application Priority Data

Jul. 27, 2016 (JP) .................. 2016-147694

(51) Int. Cl.
*G06F 16/00* (2019.01)
*G06F 16/2455* (2019.01)
*G06F 16/93* (2019.01)
*G06F 16/28* (2019.01)
*G06F 16/22* (2019.01)
*G06F 16/835* (2019.01)

(52) U.S. Cl.
CPC ...... *G06F 16/2455* (2019.01); *G06F 16/2246* (2019.01); *G06F 16/282* (2019.01); *G06F 16/835* (2019.01); *G06F 16/93* (2019.01)

(58) Field of Classification Search
CPC combination set(s) only.
See application file for complete search history.

(56) References Cited

U.S. PATENT DOCUMENTS

| | | | | |
|---|---|---|---|---|
| 7,080,059 B1 * | 7/2006 | Poston | ............. | G06F 17/30873 |
| | | | | 707/769 |
| 8,577,823 B1 * | 11/2013 | Gadir | ................ | H04L 29/08072 |
| | | | | 706/45 |
| 9,489,119 B1 * | 11/2016 | Smith, Jr. | ............. | G06F 3/0486 |
| 2003/0135495 A1 * | 7/2003 | Vagnozzi | .......... | G06F 17/30324 |
| 2004/0128284 A1 * | 7/2004 | Watanabe | ............ | G06F 16/784 |
| 2005/0187954 A1 * | 8/2005 | Raman | ............. | G06F 17/30908 |
| 2005/0278633 A1 * | 12/2005 | Kemp | ................... | G06F 3/0481 |
| | | | | 715/713 |
| 2010/0036840 A1 * | 2/2010 | Pitts | .................. | G06F 17/30106 |
| | | | | 707/726 |
| 2011/0314006 A1 * | 12/2011 | Sweeney | ............. | G06F 17/2785 |
| | | | | 707/723 |

(Continued)

FOREIGN PATENT DOCUMENTS

JP 2011-053881 A 3/2011

*Primary Examiner* — Noosha Arjomandi
(74) *Attorney, Agent, or Firm* — Oliff PLC

(57) ABSTRACT

Provided is a document search apparatus including a reception unit that receives plural search words in a hierarchical relationship, and a setting unit that sets a first content among plural contents in a hierarchical relationship included in structured document data, as a search range of a first search word received by the reception unit, and sets a second content at a same hierarchical level as a hierarchical level of the first content or a hierarchical level lower than a hierarchical level of the first content, as a search range of a second search word at a hierarchical level lower than a hierarchical level of the first search word.

15 Claims, 9 Drawing Sheets

(56) References Cited

U.S. PATENT DOCUMENTS

| | | | | |
|---|---|---|---|---|
| 2012/0306909 A1* | 12/2012 | Mochizuki | ............ | G06F 3/0481 |
| | | | | 345/619 |
| 2013/0151503 A1* | 6/2013 | Pfeifle | ................ | G06F 16/2468 |
| | | | | 707/716 |
| 2013/0325916 A1* | 12/2013 | Pitts | ................ | G06F 17/30115 |
| | | | | 707/827 |
| 2015/0186364 A1* | 7/2015 | Nelson | .............. | G06F 17/30011 |
| | | | | 707/722 |
| 2016/0299982 A1* | 10/2016 | Bhave | ................ | G06F 11/3476 |
| 2016/0335303 A1* | 11/2016 | Madhalam | .......... | G06F 17/3056 |
| 2016/0364485 A1* | 12/2016 | Meyers | .................. | G06F 16/51 |
| 2017/0235848 A1* | 8/2017 | Van Dusen | ............ | H04L 41/04 |
| | | | | 705/12 |

* cited by examiner

FIG.4

```
<SEARCHCONDITION>
  <SEARCHITEM START="H2" END="H3">
   <TEXT>DEPOSIT</TEXT>
   <ATTRS>
    <ATTR>
     <ATTRNAME>TYPE</ATTRNAME>
     <ATTRVALUE>OPERATION</ATTRVALUE>
    </ATTR>
   </ATTRS>
  </SEARCHITEM>
  <SEARCHITEM START="H3" END="H4">
   <TEXT>ORDINARY DEPOSIT</TEXT>
   <ATTRS>
    <ATTR>
     <ATTRNAME>TYPE</ATTRNAME>
     <ATTRVALUE>RULE</ATTRVALUE>
    </ATTR>
   </ATTRS>
  </SEARCHITEM>
</SEARCHCONDITION>
```

32

DOCUMENT SEARCH APPARATUS, NON-TRANSITORY COMPUTER READABLE MEDIUM, AND DOCUMENT SEARCH METHOD

CROSS-REFERENCE TO RELATED APPLICATIONS

This application is based on and claims priority under 35 USC 119 from Japanese Patent Application No. 2016-147694 filed Jul. 27, 2016.

BACKGROUND

Technical Field

The present invention relates to a document search apparatus, a non-transitory computer readable medium, and a document search method.

SUMMARY

According to an aspect of the invention, there is provided a document search apparatus including:

a reception unit that receives plural search words in a hierarchical relationship; and a setting unit that sets a first content among plural contents in a hierarchical relationship included in structured document data, as a search range of a first search word received by the reception unit, and sets a second content at a same hierarchical level as a hierarchical level of the first content or a hierarchical level lower than a hierarchical level of the first content, as a search range of a second search word at a hierarchical level lower than a hierarchical level of the first search word.

BRIEF DESCRIPTION OF THE DRAWINGS

Exemplary embodiments of the present invention will be described in detail based on the following figures, wherein:

FIG. 4 is a view illustrating an example of a search condition setting file according to an exemplary embodiment;

DETAILED DESCRIPTION

Hereinafter, an exemplary embodiment of the present invention will be described in detail with reference to the drawings.

Figure 1:
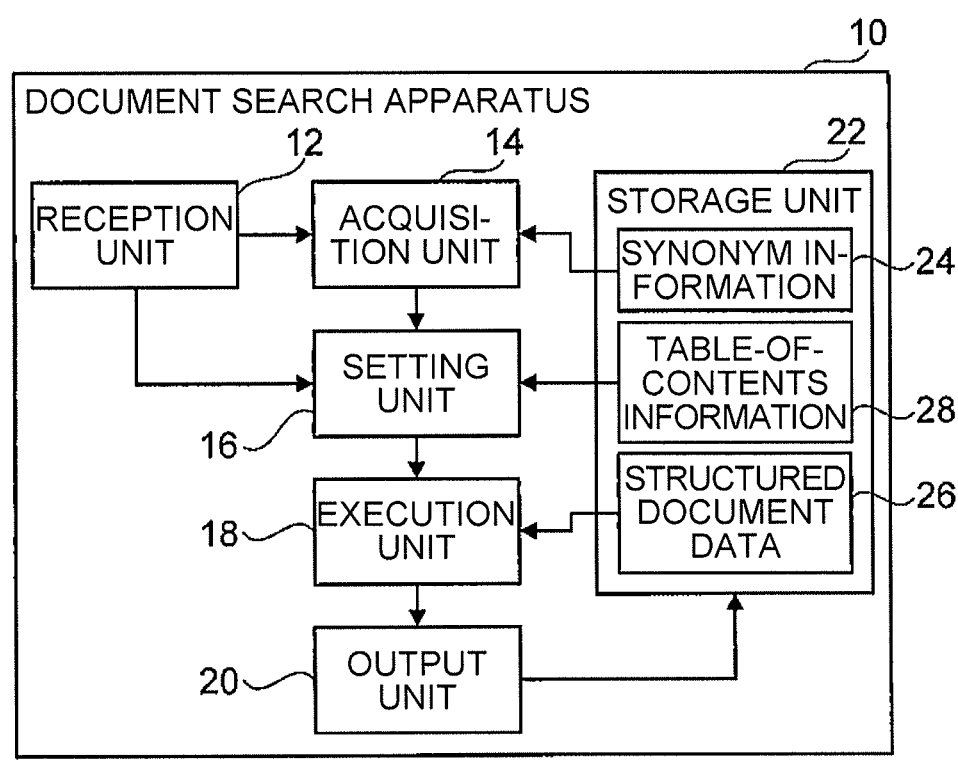
FIG. 1 is a functional block diagram illustrating a functional configuration of a document search apparatus according to an exemplary embodiment.

First, a functional configuration of a document search apparatus 10 according to an exemplary embodiment will be described with reference to FIG. 1. As illustrated in FIG. 1, the document search apparatus 10 includes a reception unit 12, an acquisition unit 14, a setting unit 16, an execution unit 18, an output unit 20 and a storage unit 22.

According to this exemplary embodiment, synonym information 24, structured document data 26, and table-of-contents information 28 are stored in the storage unit 22. According to this exemplary embodiment, a search word and a synonym of the search word are stored in association with each other in the synonym information 24. Specifically, for example, "time deposit" is stored in association with "ordinary deposit" in the synonym information 24.

Figure 2:
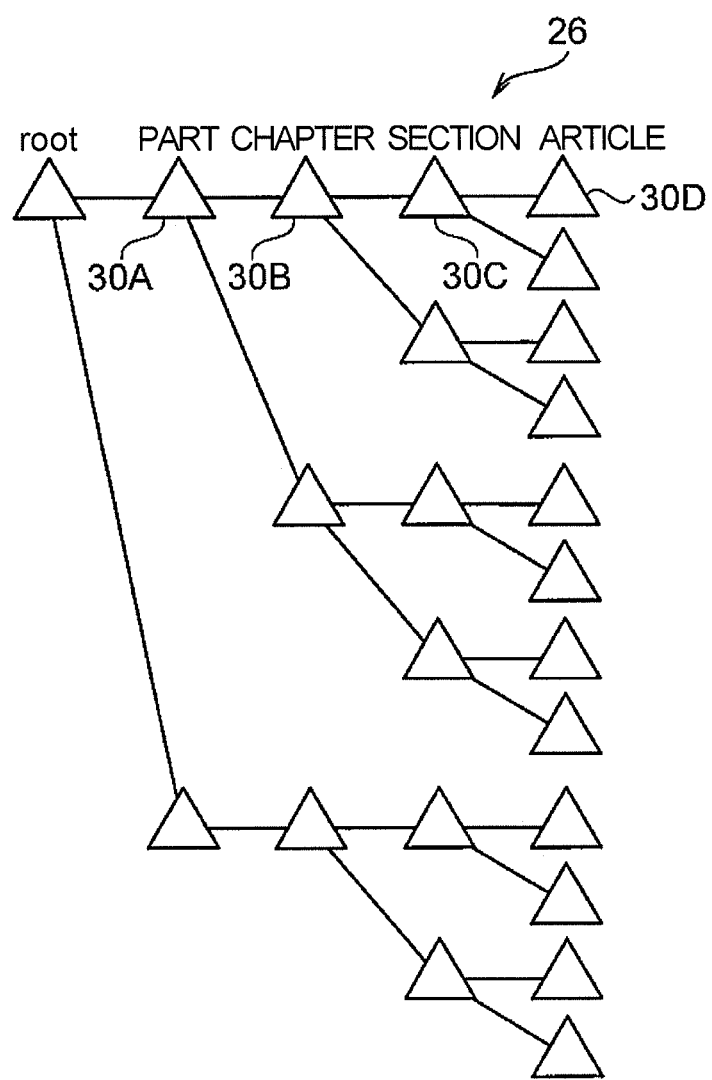
FIG. 2 is a view illustrating an example of structured document data according to an exemplary embodiment.

According to this exemplary embodiment, the structured document data 26 has plural contents in a hierarchical relationship. As an example, as illustrated in FIG. 2, the structured document data 26 has a content 30A corresponding to a "part" of a document, a content 30B corresponding to a "chapter" thereof, a content 30C corresponding to a "section" thereof, and a content 30D corresponding to an "article" thereof. Further, in this exemplary embodiment, as an example, the hierarchical relationship is defined in which the "part" is the highest hierarchical level, the "article" is the lowest hierarchical level, the "part" is the higher hierarchical level of the "chapter," the "chapter" is the higher hierarchical level of the "section," and the "section" is the higher hierarchical level of the "article." In the following description, when the contents 30A to 30D are collectively referred to without being distinguished, the alphabets at the end of the reference numerals are omitted. Further, in this exemplary embodiment, each of the contents 30 is stored in the storage unit 22 as one XML (extensible Markup Language) file.

According to this exemplary embodiment, information indicating the hierarchical relationship of each of the contents 30 and information indicating the presence or absence of a text in each of the contents 30 are stored in the table-of-contents information 28. In addition, when attribute information is set in the contents 30 at each hierarchical level, the attribute information is also stored in the table-of-contents information 28.

According to this exemplary embodiment, the reception unit 12 receives plural search words in a hierarchical relationship, which are input by a user via an input/output device 56 (see FIG. 8) to be described later. For example, the reception unit 12 receives plural search words in an upper/lower hierarchical relationship, such as "deposit" and "ordinary deposit." In addition, the reception unit 12 also receives attribute information indicating attributes related to the search words. An example of the attribute information may include information such as "OPERATION" and "RULE" for a search word "deposit."

According to this exemplary embodiment, the reception unit 12 receives a search word, for example, in the format of "deposit (@TYPE=OPERATION)/ordinary deposit." In this format, "/" indicates a delimiter of the hierarchical level and a value corresponding to @TYPE in parentheses (OPERATION in this example) indicates attribute information.

According to this exemplary embodiment, the acquisition unit 14 acquires a synonym of a search word received by the reception unit 12. In this exemplary embodiment, the acquisition unit 14 acquires a synonym of a search word at a lower hierarchical level among the plural search words received by the reception unit 12 by referring to the synonym information 24. For example, when search words received from the reception unit 12 are "deposit" and "ordinary deposit," the acquisition unit 14 acquires "time deposit" as a synonym of the "ordinary deposit."

According to this exemplary embodiment, the setting unit 16 sets a first content among the plural contents 30 in the hierarchical relationship, which are included in the structured document data 26, as a search range of a first search word received by the reception unit 12, and sets a second content at the same hierarchical level as the first content or a hierarchical level lower than that of the first content, as a search range of a second search word at a hierarchical level lower than that of the first search word.

In addition, the setting unit 16 also sets a content 30 as a search range at the corresponding hierarchical level for a synonym acquired by the acquisition unit 14. In addition, the setting unit 16 sets only a content 30 having a text among the contents 30 as a search range by referring to the table-of-contents information 28. In addition, when attribute information is added to a search word, the setting unit 16 sets only a content 30 having the same attribute information as that of the search word among the contents 30 as a search range of the search word.

Figure 3:
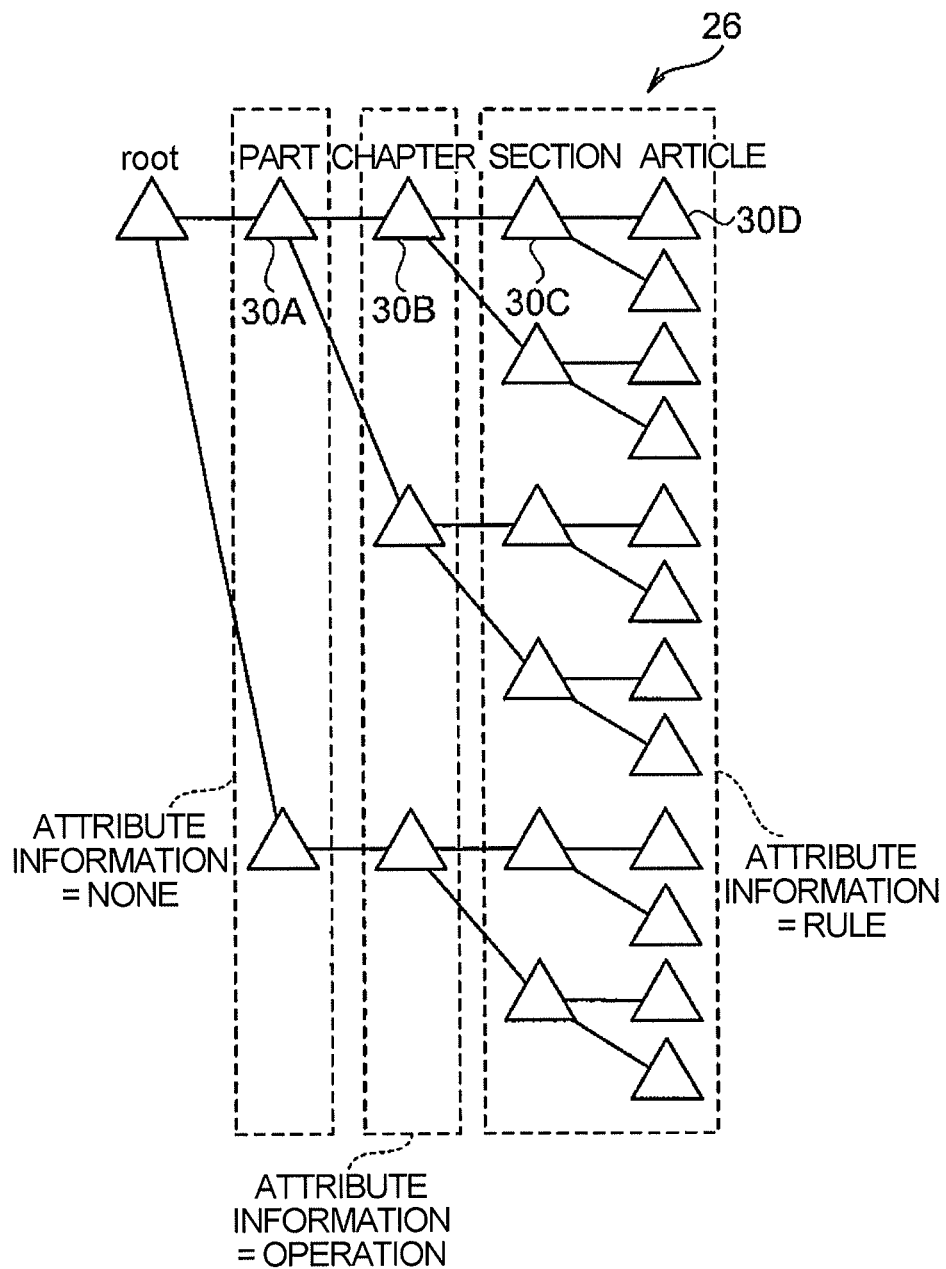
FIG. 3 is a view illustrating an example of attribute information set in contents according to an exemplary embodiment.

An example of a search condition setting process by the setting unit 16 will be described in detail with reference to FIGS. 3 and 4. Here, as an example, as illustrated in FIG. 3, a case where a content 30A at a hierarchical level of part has no attribute information, a content 30B at a hierarchical level of chapter has the attribute information "OPERATION," a content 30C at a hierarchical level of section and a content 30D at a hierarchical level of article has the attribute information "RULE" will be described. The attribute information set in each of the contents 30 is not limited to the example illustrated in FIG. 3. For example, the same attribute information may be set for all the contents 30 included in the structured document data 26, or different attribute information may be set for different contents 30. Further, for example, plural attribute information may be set for one content 30.

Further, according to this exemplary embodiment, as illustrated in FIG. 4, as an example, the setting unit 16 sets a search condition by generating a search condition setting file 32 in the format of an XML file as information indicating the search condition. FIG. 4 illustrates an example of the search condition setting file 32 in a case where the content 30A does not have a text, and the contents 30B to 30D have a text. In addition, FIG. 4 illustrates an example of the search condition setting file 32 in a case where "deposit (@TYPE=OPERATION)/ordinary deposit (@TYPE=RULE)" is received as a search word by the reception unit 12. That is, in the example in FIG. 4, "deposit" corresponds to the first search word, and "ordinary deposit" corresponds to the second search word.

As illustrated in FIG. 4, according to this exemplary embodiment, in the search condition setting file 32, a hierarchical level of a content 30 to be searched is set with a SEARCHITEM tag. In the example in FIG. 4, START indicates a hierarchical level at which a search is started, and END indicates a hierarchical level at which the search is ended. In addition, in the search condition setting file 32, a search word is set with a TEXT tag. In addition, in the search condition setting file 32, a character string indicating that attribute information is added to a search word is set with an ATTRNAME tag, and attribute information attached to the search word is set with an ATTRVALUE tag. In addition, "H2" illustrated in FIG. 4 corresponds to a hierarchical level of chapter, "H3" corresponds to a hierarchical level of section and "H4" corresponds to a hierarchical level of article.

In the example in FIG. 4, with regard to the "deposit" of a search word at an upper hierarchical level, of the content 30B at the hierarchical level of chapter and the content 30C at the hierarchical level of section which are contents each having a text, the content 30B having "OPERATION" which is the same attribute information as that of "deposit" is set as a search range.

Further, in the example in FIG. 4, with regard to the "ordinary deposit" of a search word at a lower hierarchical level, of the content 30C at the hierarchical level of the section and the content 30D at the hierarchical level of article which are contents, each of which has a text and has the same hierarchical level as that of a content set as a search range of "deposit" having the hierarchical level higher than that of the "ordinary deposit" or a hierarchical level lower than that of the set content, the contents 30C and 30D having "RULE" which is the same attribute information as that of the "ordinary deposit" are set as a search range.

In this way, according to this exemplary embodiment, the setting unit 16 sets, as a search range of the first search word (in the above example, "deposit"), the first content (in the above example, the content 30B at the hierarchical level of chapter and the content 30C at the hierarchical level of section) among the plural contents 30 in the hierarchical relationship, which are included in the structured document data 26. Further, the setting unit 16 sets, as a search range of the second search word (in the above example, "ordinary deposit"), the second content (in the above example, the contents 30C and 30D) which have the same hierarchical level (in the above example, the hierarchical level of section) as that of the first content or a hierarchical level (in the above example, the hierarchical level of section) lower than the first content.

That is, in this exemplary embodiment, a search range is set to be narrowed according to the hierarchical relationship between the search words received by the reception unit 12. Therefore, as compared with a case of full-text search using classification of attribute information, a search result is output at a high speed.

Although not illustrated in FIG. 4 in order to avoid a confusion, for example, in a case where "time deposit" is acquired as the synonym of "ordinary deposit" by the acquisition unit 14, the setting unit 16 also generates a search condition setting file 32 in which the "ordinary deposit" illustrated in FIG. 4 is replaced with "time deposit."

According to this exemplary embodiment, the execution unit 18 executes a search on the structured document data 26 with the contents 30 set by the setting unit 16 as a search target. In this exemplary embodiment, the execution unit 18 executes a search on the structured document data 26 according to the search condition setting file 32 generated by the setting unit 16.

According to this exemplary embodiment, the output unit 20 outputs the contents 30 obtained by the search by the execution unit 18 in the format of a subtree. In this exemplary embodiment, for example, as illustrated in FIGS. 5 and 6, the output unit 20 outputs a contents group 34 obtained by the search by the execution unit 18 to the storage unit 22 in the format of a subtree.

Figure 5:
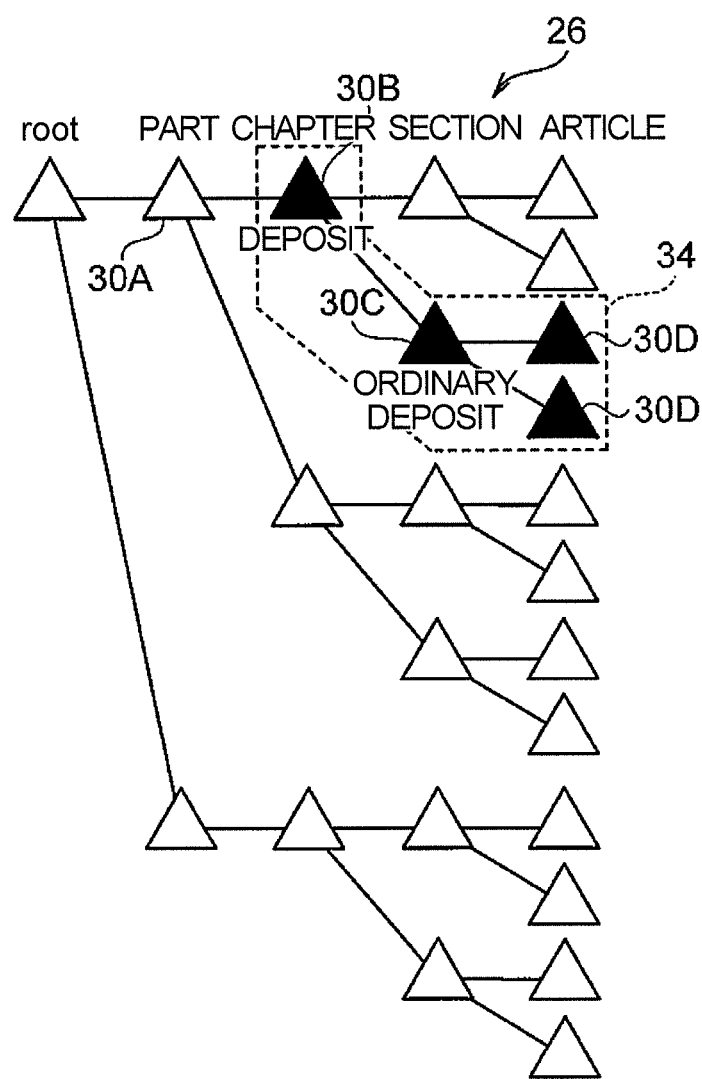
FIG. 5 is a view used to explain an example of a search result according to an exemplary embodiment.
Figure 6:
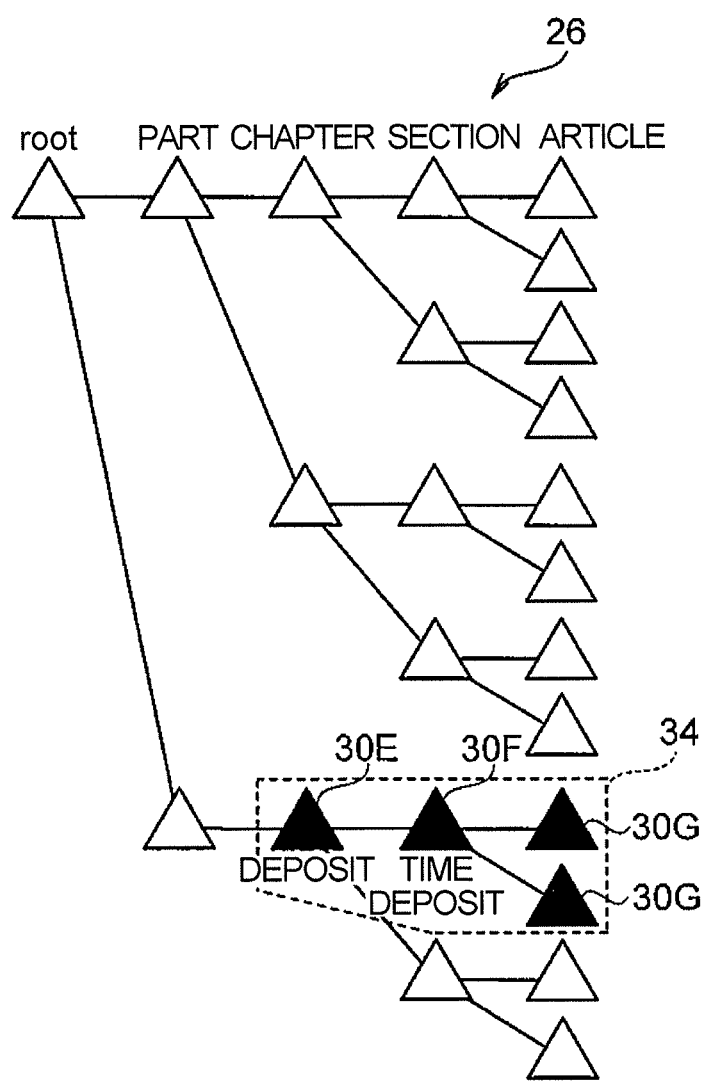
FIG. 6 is a view used to explain an example of a search result according to an exemplary embodiment.

In the example illustrated in FIG. 5, the contents group 34 includes a content 30B including "deposit" as a search word, a content 30C including "ordinary deposit," and a content 30D at a hierarchical level lower than that of the content 30C. Further, as illustrated in FIG. 6, the contents group 34 includes a content 30E including "deposit" as a search word, a content 30F including "time deposit," which is the synonym of "ordinary deposit," as a content at a lower hierarchical level of the content 30E, and a content 30G at a lower hierarchical content of the content 30F.

Figure 7:
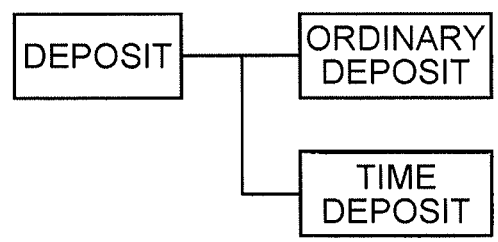
FIG. 7 is a view illustrating an example of a table-of-contents of a search result according to an exemplary embodiment.

In this way, in this exemplary embodiment, the contents 30 obtained by the search performed by the execution unit 18 are output in the format of a subtree. Therefore, as an example, as illustrated in FIG. 7, since it is possible to obtain, as a search result, a configuration in which hierarchical structures of subtrees of "deposit/ordinary deposit" and "deposit/time deposit" are combined, a table-of-contents system is created at a viewpoint different from the table-of-contents that the contents have in advance (for example, a viewpoint corresponding to each work scene). By using the table-of-contents system created at this different viewpoint, a target search result may be found faster than when displaying search results individually.

Figure 8:
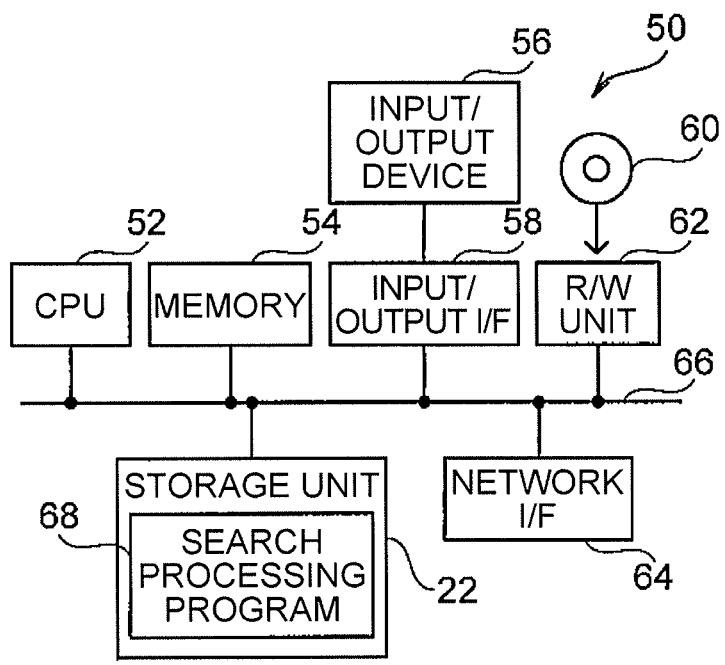
FIG. 8 is a block diagram illustrating a general configuration of a computer functioning as a document search apparatus according to an exemplary embodiment.

The document search apparatus 10 described above is realized by a computer 50 illustrated in FIG. 8. According to this exemplary embodiment, the computer 50 includes a central processing unit (CPU) 52, a memory 54 as a temporary storage area, and the storage unit 22. Further, the computer 50 includes an input/output interface (I/F) 58 to which an input/output device 56 including a display device such as a display and an input device such as a keyboard and a mouse is connected. The computer 50 also includes a read/write (R/W) unit 62 for controlling read/write of data from/in a recording medium 60, and a network I/F 64 connected to a network. The CPU 52, the memory 54, the storage unit 22, the input/output I/F 58, the R/W unit 62, and the network I/F 64 are interconnected via a bus 66.

The storage unit 22 is realized by a hard disk drive (HDD), a solid state drive (SSD), a flash memory or the like. A search processing program 68 for causing the computer 50 to function as the document search apparatus 10 is stored in the storage unit 22 as a storage medium.

The CPU 52 reads out the search processing program 68 from the storage unit 22, deploys it on the memory 54, and sequentially executes processes included in the search processing program 68. The CPU 52 executes the search processing program 68 to operate as the reception unit 12, the acquisition unit 14, the setting unit 16, the execution unit 18, and the output unit 20 illustrated in FIG. 1. As a result, the computer 50 on which the search processing program 68 is installed functions as the document search apparatus 10.

Figure 9:
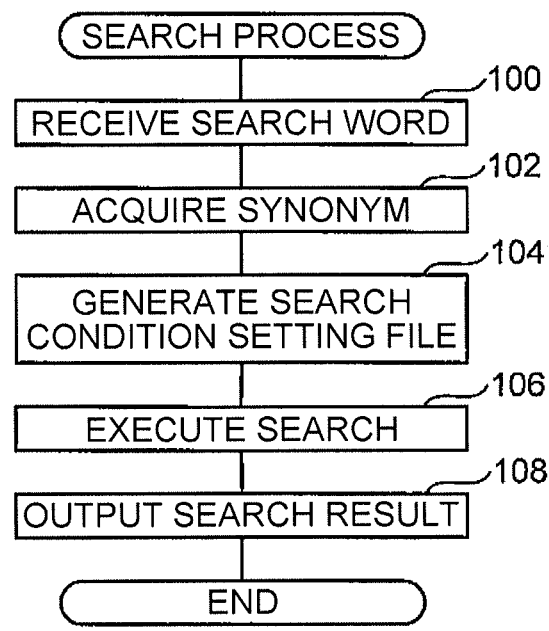
FIG. 9 is a flowchart illustrating an example of a search process according to an exemplary embodiment.

Next, the operation of the document search apparatus 10 according to this exemplary embodiment will be described. By executing the search processing program 68 by the computer 50, a search process illustrated in FIG. 9 is executed. The search process illustrated in FIG. 9 is executed, for example, when plural search words in a hierarchical relationship are input by a user via the input/output device 56, and an execution instruction to start a search is input.

In step 100 in FIG. 9, the reception unit 12 receives plural search words in a hierarchical relationship, which are input by the user via the input/output device 56. In the next step 102, as described above, the acquisition unit 14 acquires the synonyms of the search words received in step 100 by referring to the synonym information 24. No synonyms of the received search words may sometimes exist in the synonym information 24, in which case no processing on synonyms is performed in the subsequent process.

In the next step 104, as described above, the setting unit 16 generates the search condition setting file 32 based on the search words received in step 100, the synonyms acquired in step 102, and the table-of-contents information 28.

In the next step 106, the execution unit 18 executes a search on the structured document data 26 according to the search condition setting file 32 generated in step 104. In the next step 108, the output unit 20 outputs the contents group 34 obtained by the search by the process of step 106 in the format of a subtree to the storage unit 22, and then, the search process is ended.

Figure 10:
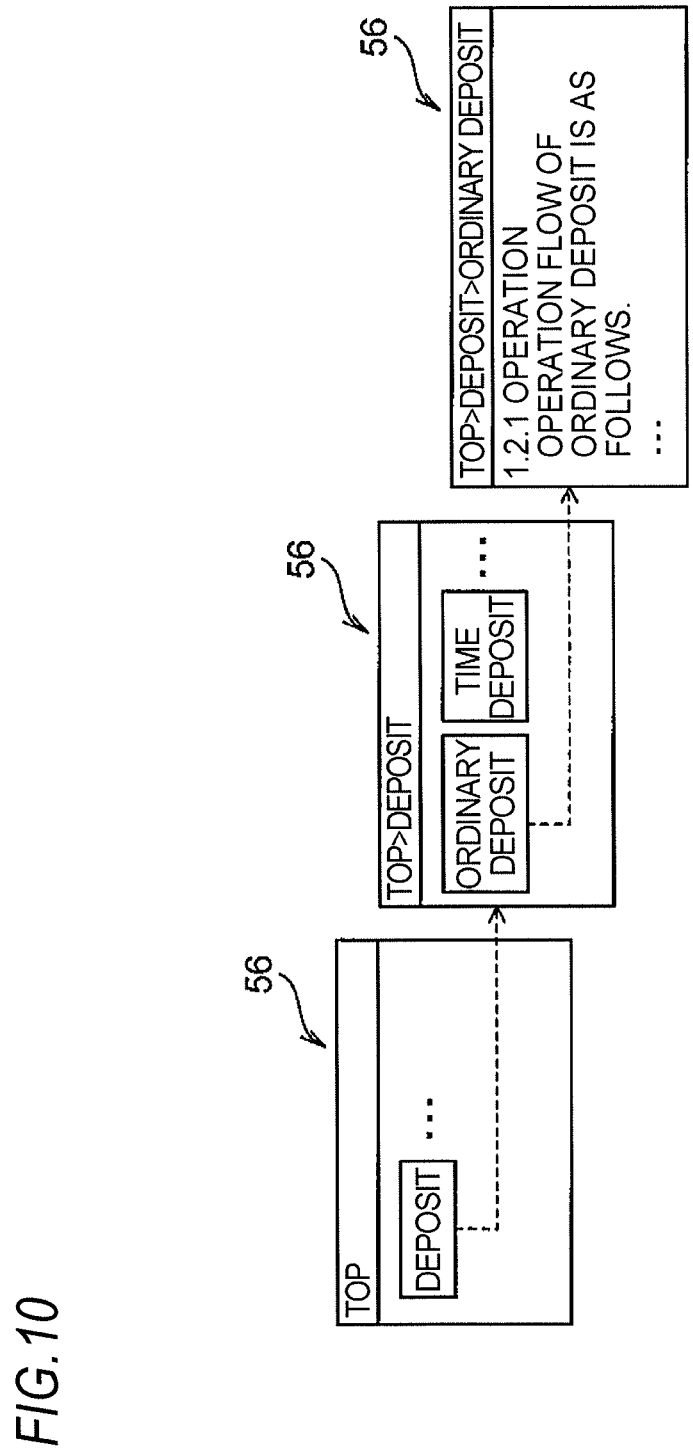
FIG. 10 is a view illustrating an example of screen transition of a search result display screen according to a modified example.

In the above exemplary embodiment, the output unit 20 may output the contents 30 including the search words to a display of the input/output device 56 in a form that may trace the contents 30 according to the hierarchical relationship of the search words used for the search for the structured document data 26. An example of screen transition of a search result display screen displayed on the display by the output of the output unit 20 is illustrated in FIG. 10. As illustrated in FIG. 10, in this example, first, a deposit button corresponding to "deposit" which is a search word at the highest hierarchical level is displayed on the search result display screen.

Then, for example, when the deposit button is designated by the user via the input device of the input/output device 56, an ordinary deposit button and a time deposit button corresponding respectively to the ordinary deposit and the time deposit at a lower hierarchical level of the deposit are displayed. Further, for example, when the ordinary deposit button is designated by the user via the input device of the input/output device 56, a corresponding portion of the contents 30 including "ordinary deposit" is displayed.

Further, the case of applying two hierarchies as the number of hierarchies of search words has been described in the above exemplary embodiment, but the present invention is not limited thereto. Three or more hierarchical levels may be applied as the number of hierarchical levels of search words. Of course, the number of hierarchical levels of the structured document data is not limited to four hierarchical levels. However, it is desirable that the number of hierarchical levels of search words is less than the number of hierarchical levels of the structured document data.

Further, the case where the information indicating the hierarchical relationship of the contents 30 is included in the table-of-contents information 28 has been described in the above exemplary embodiment, but the present invention is not limited thereto. For example, when the structured document data 26 is one XML file, the hierarchical relationship of the contents 30 may be determined from an inclusion relationship of tags representing the hierarchical levels. As in this example, when the information indicating the hierarchical relationship of the contents 30 is included in the structured document data 26, no information indicating the hierarchical relationship of the contents 30 may be included in the table-of-contents information 28.

Further, the case where the search processing program 68 is stored (installed) in the storage unit 22 in advance has been described in the above exemplary embodiment, but the present invention is not limited thereto. The search processing program 68 may be provided in a form recorded in a recording medium such as a compact disk read only memory (CD-ROM), a digital versatile disk read only memory (DVD-ROM), or a universal serial bus (USB). Further, the search processing program 68 may be downloaded from an external device via a network.

Furthermore, the case where the search process is realized by a software configuration using a computer by executing a program has been described in the above exemplary embodiment, but the present invention is not limited thereto. For example, the search process may be realized by a hardware configuration or a combination of a hardware configuration and a software configuration.

The configuration of the document search apparatus 10 (see FIG. 1) described in the above exemplary embodiment is just an example, and unnecessary portions may be deleted or new portions may be added without departing from the spirit and scope of the present invention.

Further, the flow of the search process (see FIG. 9) described in the above exemplary embodiment is also just an example, and unnecessary steps may be deleted, new steps may be added or an order of processing may be changed without departing from the spirit and scope of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document search apparatus comprising:
a processor programmed to:
receive a plurality of search words in a hierarchical relationship; and
set a first content among a plurality of contents in a hierarchical relationship included in structured document data, as a search range of a first search word;
set a second content at a same hierarchical level as a hierarchical level of the first content or a hierarchical level lower than the hierarchical level of the first content, as a search range of a second search word at a hierarchical level lower than a hierarchical level of the first search word; and
set contents having same attribute information as attribute information of respective search words among the plurality of contents, as search targets of the respective search words.

2. The document search apparatus according to claim 1, wherein the processor is programmed to:
acquire a synonym of at least one of the plurality of search words; and
set the second content as a search range at a corresponding hierarchical level for the synonym.

3. The document search apparatus according to claim 2, wherein the processor is programmed to, based on table-of-contents information including information indicating presence or absence of a text for each of the plurality of contents, set the first content and the second content with a content having the text as a search target.

4. The document search apparatus according to claim 2, wherein the processor is programmed to:
execute a search on the structured document data with the first content and the second content as search targets; and
output contents obtained by the search in a format of a subtree.

5. The document search apparatus according to claim 2, wherein the processor is programmed to:
execute a search on the structured document data with the first content and the second content as search targets; and
output a result of the search to a display in a form allowing tracing contents including the search words according to a hierarchical relationship of the search words used for the search on the structured document data.

6. The document search apparatus according to claim 1, wherein the processor is programmed to, based on table-of-contents information including information indicating presence or absence of a text for each of the plurality of contents, set the first content and the second content with a content having the text as a search target.

7. The document search apparatus according to claim 6, wherein the processor is programmed to:
execute a search on the structured document data with the first content and the second content as search targets; and
output contents obtained by the search in a format of a subtree.

8. The document search apparatus according to claim 6, wherein the processor is programmed to:
execute a search on the structured document data with the first content and the second content as search targets; and
output a result of the search to a display in a form allowing tracing contents including the search words according to a hierarchical relationship of the search words used for the search on the structured document data.

9. A non-transitory computer readable medium storing a program causing a computer to function as the processor of the document search apparatus according to claim 6.

10. The document search apparatus according to claim 1, wherein the processor is programmed to, based on table-of-contents information including information indicating presence or absence of a text for each of the plurality of contents, set the first content and the second content with a content having the text as a search target.

11. The document search apparatus according to claim 1, wherein the processor is programmed to:
execute a search on the structured document data with the first content and the second content as search targets; and
output contents obtained by the search in a format of a subtree.

12. The document search apparatus according to claim 1, wherein the processor is programmed to:
execute a search on the structured document data with the first content and the second content as search targets; and
output a result of the search to a display in a form allowing tracing contents including the search words according to a hierarchical relationship of the search words used for the search on the structured document data.

13. A non-transitory computer readable medium storing a program causing a computer to function as the processor of the document search apparatus according to claim 1.

14. A non-transitory computer readable medium storing a program causing a computer to function as the processor of the document search apparatus according to claim 2.

15. A document search method comprising:
receiving, by a processor, a plurality of search words in a hierarchical relationship;

setting, by the processor, a first content among a plurality of contents in a hierarchical relationship included in structured document data, as a search range of a first search word;

setting, by the processor, a second content at a same hierarchical level as a hierarchical level of the first content or a hierarchical level lower than the hierarchical level of the first content, as a search range of a second search word at a hierarchical level lower than a hierarchical level of the first search word; and setting, by the processor, contents having same attribute information as attribute information of respective search words among the plurality of contents, as search targets of the respective search words.

\* \* \* \* \*